United States Patent
Lu et al.

(10) Patent No.: US 11,762,779 B1
(45) Date of Patent: Sep. 19, 2023

(54) DATA BLOCK TRANSFER WITH EXTENDED READ BUFFERING

(71) Applicant: Micron Technology, Inc., Boise, ID (US)

(72) Inventors: Zhongyuan Lu, Boise, ID (US); Niccolo' Righetti, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/860,293

(22) Filed: Jul. 8, 2022

(51) Int. Cl.
*G06F 12/0895* (2016.01)

(52) U.S. Cl.
CPC .... *G06F 12/0895* (2013.01); *G06F 2212/254* (2013.01)

(58) Field of Classification Search
CPC .......... G06F 12/0895; G06F 2212/245; G06F 2212/7205
USPC ......................................................... 711/141
See application file for complete search history.

(56) References Cited

U.S. PATENT DOCUMENTS

| | | | | |
|---|---|---|---|---|
| 9,727,470 | B1* | 8/2017 | Cande | G06F 3/067 |
| 2011/0093654 | A1* | 4/2011 | Roberts | G06F 1/3203 |
| | | | | 711/E12.001 |
| 2012/0159051 | A1* | 6/2012 | Hida | G06F 12/0246 |
| | | | | 711/E12.008 |
| 2015/0058525 | A1* | 2/2015 | Venkata | G06F 12/0866 |
| | | | | 711/170 |
| 2016/0323348 | A1* | 11/2016 | Bradbury | H04L 65/611 |
| 2017/0351603 | A1* | 12/2017 | Zhang | G06F 3/0604 |
| 2019/0236005 | A1* | 8/2019 | Lee | G06F 3/0659 |
| 2019/0361608 | A1* | 11/2019 | Kim | G06F 3/064 |
| 2021/0365415 | A1* | 11/2021 | Liu | G06F 16/14 |
| 2022/0129172 | A1* | 4/2022 | Nagarajegowda | G06F 3/0604 |
| 2023/0118118 | A1* | 4/2023 | Koning | G06F 16/182 |
| | | | | 707/769 |

\* cited by examiner

*Primary Examiner* — Reginald G Bragdon
*Assistant Examiner* — Aaron D Ho
(74) *Attorney, Agent, or Firm* — Schwegman Lundberg & Woessner, P.A.

(57) ABSTRACT

Various embodiments enable read buffering in connection with data block transfer on a memory device. For some embodiments, read buffering from a set of cache blocks is enabled during a period of wait time after data is copied (e.g., data is transferred, such as part of a compaction operation) from the set of cache blocks to a set of non-cache blocks. In various embodiments, after the wait time, data stored on the set of cache blocks is erased (e.g., the set of cache blocks is released) and read buffering from the set of cache blocks is disabled.

20 Claims, 9 Drawing Sheets

DATA BLOCK TRANSFER WITH EXTENDED READ BUFFERING

TECHNICAL FIELD

Embodiments of the disclosure relate generally to memory devices and, more specifically, to extended read buffering in connection with data block transfers on a memory device, which can be part of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
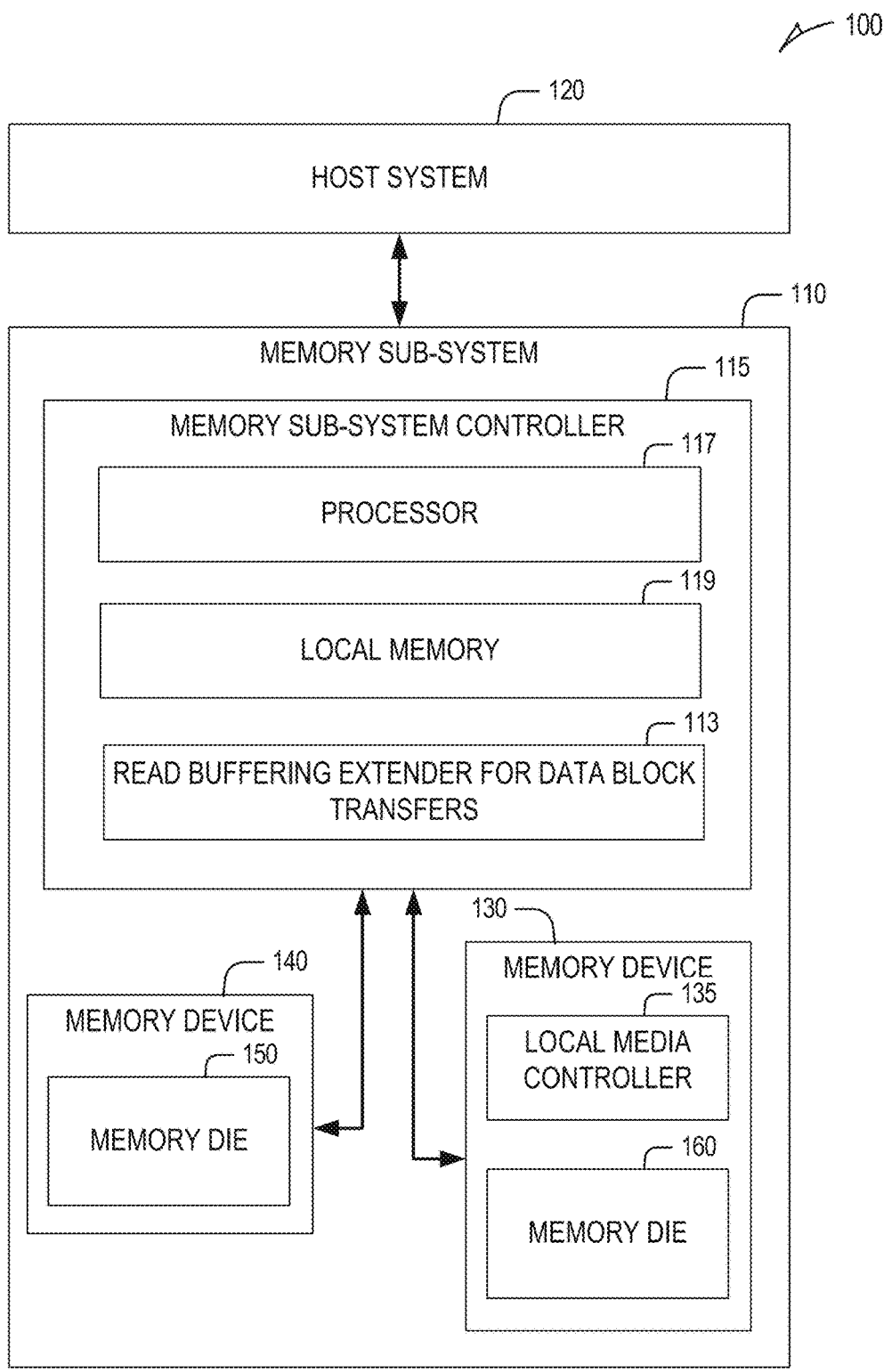
FIG. 1 is a block diagram illustrating an example computing system that includes a memory sub-system, in accordance with some embodiments of the present disclosure.

Aspects of the present disclosure are directed to extended read buffering in connection with data block transfers on a memory device, which can be part of a memory sub-system. In particular, some embodiments enable read buffering from a set of cache blocks (e.g., single-level cell (SLC) blocks) during and for a period of wait time after data is copied (e.g., data is transferred) from the set of cache blocks (e.g., SLC blocks) to a set of non-cache blocks (e.g., multiple-level cell (MLC), triple-level cell (TLC), or quad-level cell (QLC) blocks). Such data copying (e.g., data transferring) can be performed as part of a compaction operation performed on the set of cache blocks. During the period of wait time after the copy (e.g., transfer) has completed, the set of cache blocks and the set of non-cache blocks could be storing the same data (e.g., wait data) but any incoming requests to read the data would be read from the set of cache blocks rather than the set of non-cache blocks. In doing so, memory cells associated with the set of non-cache blocks can be provided with a period of wait time to bake (e.g., bake recover) prior to a read operation being performed on (e.g., a read disturb (RD) occurring with respect to) memory cells, which in turn can result in improved charge margins (e.g., larger energy zero (E0) margins) for those memory cells. After sufficient time has elapsed, (e.g., the period of wait time has elapsed), the data on the set of cache blocks can be emptied (e.g., SLC blocks can be released for new data). According to various embodiments, the period of wait time is based on a temperature associated with the memory cells of the set of non-cache blocks. The temperature can be obtained, for example, at the start, during, or at the end of the data copy (e.g., transfer) from the set of cache blocks to the set of non-cache blocks. Additionally, the period of wait time can be dynamically adjusted (e.g., up or down) during the period of wait time based on a change in the temperature observed during the period of wait time.

As used herein, baking a memory cell (or a memory cell (e.g., negative-and (NAND) memory cell is baked) comprises the phenomenon where thermal energy (e.g., from ambient environment or applied) around the memory cell enables holes in an oxide layer of the memory cell to recombine with electrons of the oxide layer. A memory cell can naturally bake (e.g., from ambient heat surrounding the memory cell) between data (e.g., bits) being written to (e.g., programmed on) the memory cell or stored data (e.g., stored bit) being erased from the memory cell. How quickly the holes and electrons recombine during bake can be based on a temperature (e.g., bake temperature) of the memory cell (e.g., higher the temperature, the faster the recombination) and based on how long the memory cell bakes (e.g., the longer the duration of the bake, the higher the likelihood that all holes have recombined with electrons). Additionally, the rate of recombination can be more sensitive to the temperature (e.g., bake temperature) than the time duration of the bake (e.g., bake time). Generally, the recombination of holes and electrons in the oxide layer can reduce the electric field near an interface between a channel of the memory cell and the oxide layer and can mitigate the charge gain between retention or read disturbs. This results in an increase in the charge margin of the memory cell. For instance, L0 of a QLC can be a hole rich state after the QLC has been erased (e.g., via one or more erase (ERS) pulses) or data has been written to the QLC (e.g., via one or more program (PGM) pulses), and the charge margins of the QLC can benefit from a high bake temperature for a certain period of time.

A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

A memory device can be a non-volatile memory device. A non-volatile memory device is a package of one or more die. Each die can be comprised of one or more planes. For some types of non-volatile memory devices (e.g., AND-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package.

Certain memory devices, such as NAND-type memory devices, comprise one or more blocks, (e.g., multiple blocks), with each of those blocks comprising multiple memory cells. For instance, a memory device can comprise multiple pages (also referred as wordlines), with each page comprising a subset of memory cells of the memory device. A memory device can comprise one or more cache blocks and one or more non-cache blocks, where data written to the memory device is first written to one or more cache blocks, which can facilitate faster write performance; and data stored on the cache blocks can eventually be moved (e.g., copied) to one or more non-cache blocks at another time (e.g., a time when the memory device is idle), which can facilitate higher storage capacity on the memory device. A non-cache block can comprise a SLC block that comprises multiple SLCs, and a cache block can comprise a MLC block that comprises multiple MLs, a TLC block that comprises multiple TLCs, or a QLC block that comprises QLCs. Writing first to one or more SLCs blocks can be referred to as SLC write caching. A threshold voltage (VT) of a memory cell (of a block) can be the voltage at which the floating gate (e.g., NAND transistor), implementing the memory cell, turns on and conducts (e.g., to a bit line coupled to the memory cell). Generally, writing data to such memory devices involves programming (by way of a program operation) the memory devices at the page level of a block, and erasing data from such memory devices involves erasing the memory devices at the block level (e.g., page level erasure of data is not possible).

A compaction operation can be performed with respect to a cache block (containing one or more memory cells) of a memory device (e.g., NAND-type memory device), where the data stored in the cache block is copied (e.g., transferred) to a non-cache block. A compaction operation can be performed with respect to a set of cache blocks when, for instance, there are no available cache blocks to cache new data (e.g., cache new written data).

For conventional memory technologies, RD can be a challenge for NAND-based memory devices, especially with respect to low charge levels (e.g., level zero (L0)) of NAND memory cells, where charge gain through trap-assisted-tunneling (TAT) can degrade (e.g., energy zero (E0)) margin significantly. While traditional mechanisms for addressing this challenge can provide a large enough guard band for valley 0 of memory cells to cover RD and retention induced by energy E0 degradation, such mechanisms either have limits in addressing other valleys or detrimentally impact endurance of memory cells (e.g., by pushing L0 too low with strong ERS pulses).

According to some embodiments, extended read buffering is provided in connection with data block transfer on a memory device. For some embodiments, read buffering from a set of cache blocks is enabled during a period of wait time (also referred to herein as wait time) after data is copied (e.g., data is transferred, such as part of a compaction operation) from the set of cache blocks to a set of non-cache blocks. In various embodiments, after the wait time, data stored on the set of cache blocks is erased (e.g., the set of cache blocks is released) and read buffering from the set of cache blocks is disabled (e.g., a request from a host system to read data from a memory device is serviced by reading data from the set of non-cache blocks instead of the set of cache blocks). For some embodiments, when data stored on a set of cache blocks is copied to a set of non-cache blocks (e.g., SLC=>xLC data transfer as part of a compaction operation), the stored data is not discarded (e.g., original SLC content) immediately but, rather, retained for a wait time, where the wait time is determined based on a temperature associated with the set of non-cache blocks (e.g., 4 hours at 55 C or 3 minutes at 125 C). During that wait time, if requested by a host system, the stored data is read from the set of cache blocks (e.g., of a SLC cache) rather than the copy of the stored data on the set of non-cache blocks. After the wait time, the set of cache blocks occupied with data (e.g., occupied SLC cache space) can be released (e.g., erased) for new data writes. For various embodiments, the wait time provides the set of non-cache blocks (e.g., data bits written to xLC blocks, where xLC can include MLC, TLC, and QLC) with extra bake time before a RD, which in turn can provide improved charge margins (e.g., larger E0 margins).

For some embodiments, during the wait time, the wait time is adjusted based on feedback from a thermometer associated with at least non-cache blocks (e.g., thermometer for a memory device or a memory sub-system that includes the non-cache blocks). For instance, during the wait time, if the thermometer is capturing high temps (e.g., detecting a higher temp period), the wait time can be decreased to improve the efficiency. For example, the wait time can be increased if a period of time (e.g., high temp period) is detected where temperature (associated with the set of non-cache blocks) is higher than the temperature captured when the wait time was initially determined. However, if during the wait time, the thermometer is capturing low temps (e.g., low temp period), then the wait time can be increased (e.g., extended) to achieve sufficient charge margin (e.g., E0 margin) improvement. For example, the wait time can be decreased if a period of time (e.g., low temp period) is detected where a temperature (associated with the set of non-cache blocks) is lower than the temperature captured when the wait time was initially determined. Additionally, for some embodiments, if during the wait time, a new write request is received and the cache blocks are considered full (e.g., no cache blocks are available for new writes), some or all of the set of cache blocks storing data during the wait time can be released (e.g., erased) prior to expiration of the wait time, thereby freeing up cache blocks for the new write request. Even where applicable cache blocks are released prior to the wait time ending, such cache blocks still benefit from the wait time that did elapse.

As used herein, a physical memory location of a memory die can comprise a block, a page, or a memory cell. For instance, where a physical memory location comprises a page or a memory cell, a set of physical memory locations can represent a single block or multiple blocks. The set of physical memory locations can be a set of contiguous physical memory locations. As used herein, storing data on one or more physical memory locations of a memory die can comprise writing data to the one or more physical memory locations, where the writing can comprise programming one or more pages of a block with the data.

As used herein, a block compaction operation is performed on a cache block and can comprise reading data stored on the cache block and writing the read data to a non-cache block (e.g., programming the non-cache block with the data read from the cache block), thereby copying the data from the cache block to the non-cache block An example cache block can include a SLC block, and an example non-cache block can include a MLC, TLC, or QLC block. Additionally, an example block compaction operation can include a SLC-QLC block compaction operation. A block compaction operation can be performed, for instance, when available cache blocks on a memory device are full or nearing a fill limit.

Disclosed herein are some examples of extending read buffering in connection with data block transfers on a memory device, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, USB interface, Fibre Channel, Serial Attached SCSI (SAS), Small Computer System Interface (SCSI), a double data rate (DDR) memory bus, a DIMM interface (e.g., DIMM socket interface that supports DDR), Open NAND Flash Interface (ONFI), DDR, Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130 can include one or more arrays of memory cells. One type of memory cell, for example, SLCs, can store one bit per cell. Other types of memory cells, such as MLCs, TLCs, QLCs, and penta-level cells (PLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

As used herein, a block comprising SLCs can be referred to as a SLC block, a block comprising MLCs can be referred to as a MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., LBA, namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

Each of the memory devices 130, 140 include a memory die 150, 160. For some embodiments, each of the memory devices 130, 140 represents a memory device that comprises a printed circuit board, upon which its respective memory die 150, 160 is solder mounted.

The memory sub-system controller 115 includes a read buffering extender for data block transferer 113 (hereafter, the read buffering extender 113) that enables or facilitates the memory sub-system controller 115 to extend read buffering in connection with data block transfers on one or both of the memory devices 130, 140. Alternatively, some or all of the read buffering extender 113 is included by the local media controller 135, thereby enabling the local media controller 135 to enable or facilitate extending read buffering in connection with a data block transfer.

FIGS. 2 through 6 are flow diagrams of example methods for extended read buffering in connection with data block transfers on a memory device, in accordance with some embodiments of the present disclosure. The methods 200, 300, 400, 500, 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 200, 300, 400, 500, 600 is performed by the memory sub-system controller 115 of FIG. 1 based on the read buffering extender 113. Additionally, or alternatively, for some embodiments, at least one of the methods 200, 300, 400, 500, 600 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Figure 2:
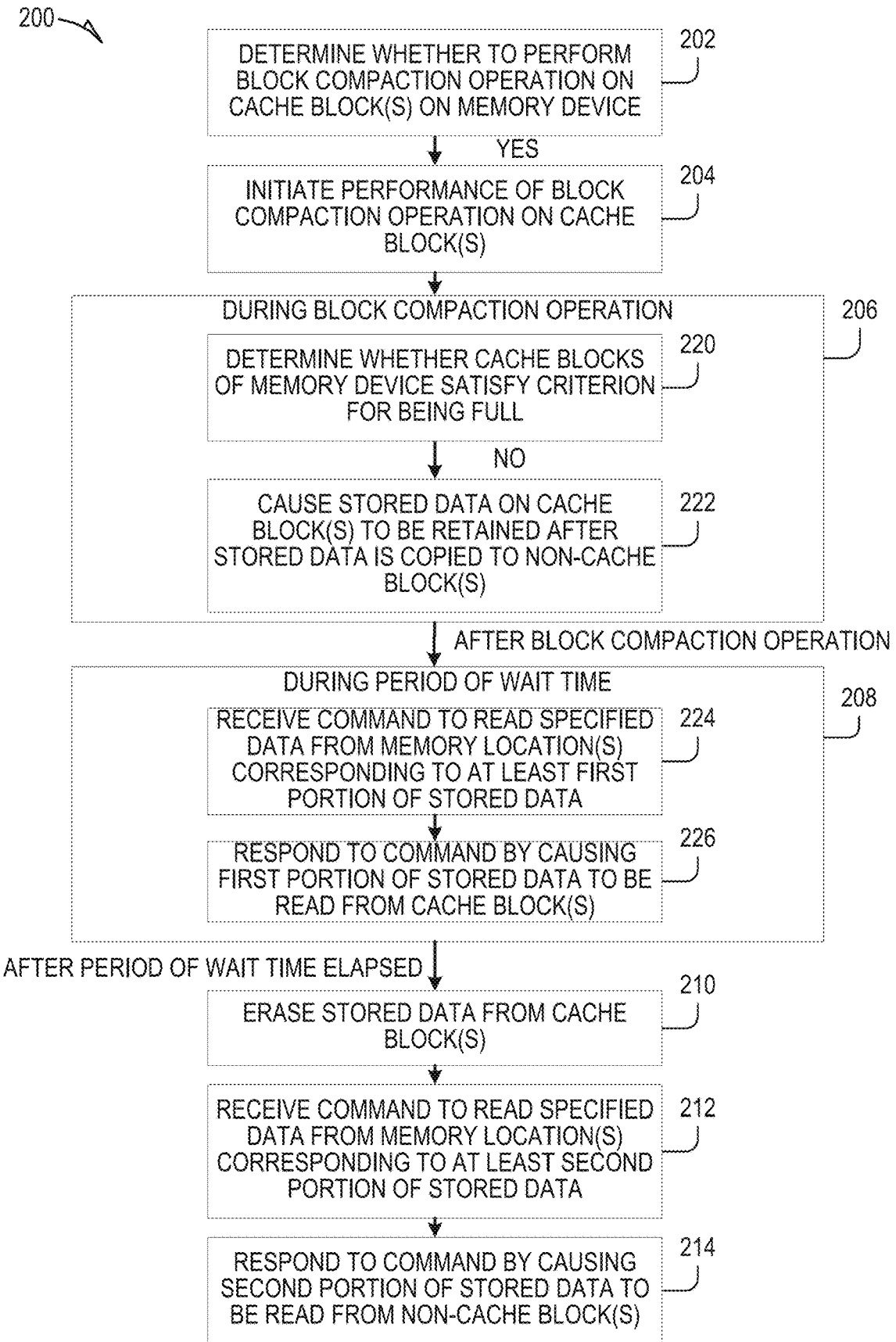
FIGS. 2 through 6 are flow diagrams of example methods for extended read buffering in connection with data block transfers on a memory device, in accordance with some embodiments of the present disclosure.

Referring now to the method 200 of FIG. 2, the method 200 illustrates an example of enabling and using extended read buffering using cache blocks in connection with a data transfer from cache blocks to non-cache blocks, in accordance with some embodiments.

At operation 202, a processing device (e.g., the processor 117 of the memory sub-system controller 115) determines whether to perform a block compaction operation on one or more of the set of cache blocks of a memory device (e.g., 130). Operation 202 can be performed by the processing device in response to determining that the set of cache blocks satisfies a set of criteria for performing the block compaction operation, which can include a time-based criterion, an age criterion for the data stored on the set of cache blocks, or storage availability criterion on the set of cache blocks, and the like. For some embodiments, the block compaction operation comprises copying (e.g., transferring) stored data from the one or more cache blocks to one or more of a set of non-cache blocks of the memory device (e.g., 130). Depending on the embodiment, a cache block can comprise a SLC block (e.g., the memory sub-system 110 is using SLC caching), and a non-cache block can comprise one of a MLC block, a TLC block, or a QLC block.

In response to the processing device determining to perform the block compaction operation on the one or more cache blocks (of the set of cache blocks), at operation 204, the processing device (e.g., 117) initiates (e.g., starts) performance of the block compaction operation on the one or more cache blocks. At operation 206, during (or while) the block compaction operation is being performed on the one or more cache blocks, the processing device (e.g., 117) performs one or both of operations 220 and 222.

At operation 220, the processing device (e.g., 117) determines whether the set of cache blocks (of the memory device) satisfies a criterion for being full. For instance, this criterion can be satisfied when no cache blocks (in the set of cache blocks) are currently available, or not enough cache block (in the set of cache blocks) are available, to cache new data being written to the memory device (e.g., 130) in response to a write request (e.g., from the host system 120). In response to the processing device determining that the set of cache blocks does not satisfy the criterion for being full, at operation 222 the processing device causes the stored data to be retained on the one or more cache blocks after the stored data is copied to the one or more non-cache blocks. For some embodiments, the stored data is retained for at least a period of wait time after the block compaction operation has ended. As described herein, by servicing read requests (e.g., from the host system 120) using the stored data (e.g., cache data) retained on the one or more cache blocks during the period of wait time (after the block compaction operation), various embodiments can provide the set of non-cache blocks (e.g., data bits written to the set of non-cache blocks) with bake time prior to a RD (e.g., (e.g., sufficient bake time to optimal E0 margin).

According to some embodiments, the period of wait time is determined based on a temperature associated with the set of non-cache blocks, such as the temperature of the memory device (e.g., 130) that includes the set of non-cache blocks. Depending on the embodiment, the temperature can be obtained at the start of, during, or at the end of the block compaction operation. After the temperature is obtained, the processing device (e.g., 117) can determine the period of wait time (e.g., determine an initial period of wait time) based on the temperature near the start of, during, or near the end of the block compaction operation. Additionally, as described herein and illustrated with respect to FIG. 4, the period of wait time can be dynamically adjusted (e.g., changed) during the period of wait time based on detected temperature changes (e.g., the period of wait time can be increased if the temperature falls and remains below the temperature used to determine the initial period of wait time, and the period of wait time can be decreased if the temperature increases and remains above the temperature used to determine the initial period of wait time).

After the block compaction operation ends, the processing device (e.g., 117) can determine (e.g., monitor) if or when the period of wait time has elapsed (e.g., completely elapsed or expired) since the block compaction operation ended. Depending on the embodiment, the processing device can determine facilitate this by initiating (e.g., starting) and monitoring a timer (to track how time has elapsed since the block compaction operation ended) or determining a time (e.g., timestamp) for when the block compaction operation ends and determine a time (e.g., timestamp) when a next relevant operation of the method 200 is performed. At operation 208, during the period of wait time after the block compaction operation ends, the processing device (e.g., 117) performs one or both of operations 224 and 226.

At operation 224, the processing device (e.g., 117) receives, from a host (e.g., the host system 120), a command to read specified (or requested) data from one or more memory locations on the memory device (e.g., 130), where at least one of the one or more memory locations corresponds to at least a first portion of the stored data on the one or more cache blocks. In response to the stored data being retained on the one or more cache blocks, at operation 226, the processing device (e.g., 117) responds to the command by causing the first portion of the stored data to be read from the one or more cache blocks (e.g., SLC blocks) rather than the one or more non-cache blocks (e.g., xLC blocks, such as MLC blocks, TLC blocks, or QLC blocks).

Eventually, after the period of time has elapsed (e.g., completely elapsed or expired) after the block compaction operation has ended, at operation 210, the processing device (e.g., 117) erases (or invalidates) the stored data from the one or more cache blocks. In doing so, various embodiments can enable or cause the one or more cache blocks to be released and made available for use with new data.

Eventually, after the period of time has elapsed (e.g., completely elapsed or expired) after the block compaction operation has ended, at operation 212, the processing device (e.g., 117) receives, from the host (e.g., the host system 120), a command to read specified (or requested) data from one or more memory locations on the memory device (e.g., 130), where at least one of the one or more memory locations corresponds to at least a second portion of the stored data on the one or more cache blocks. After the period of time has elapsed (e.g., completely elapsed or expired) after the block compaction operation has ended, at operation 214, the processing device (e.g., 117) responds to the command by causing the second portion of the stored data to be read from the one or more non-cache blocks (e.g., xLC blocks).

Figure 3:
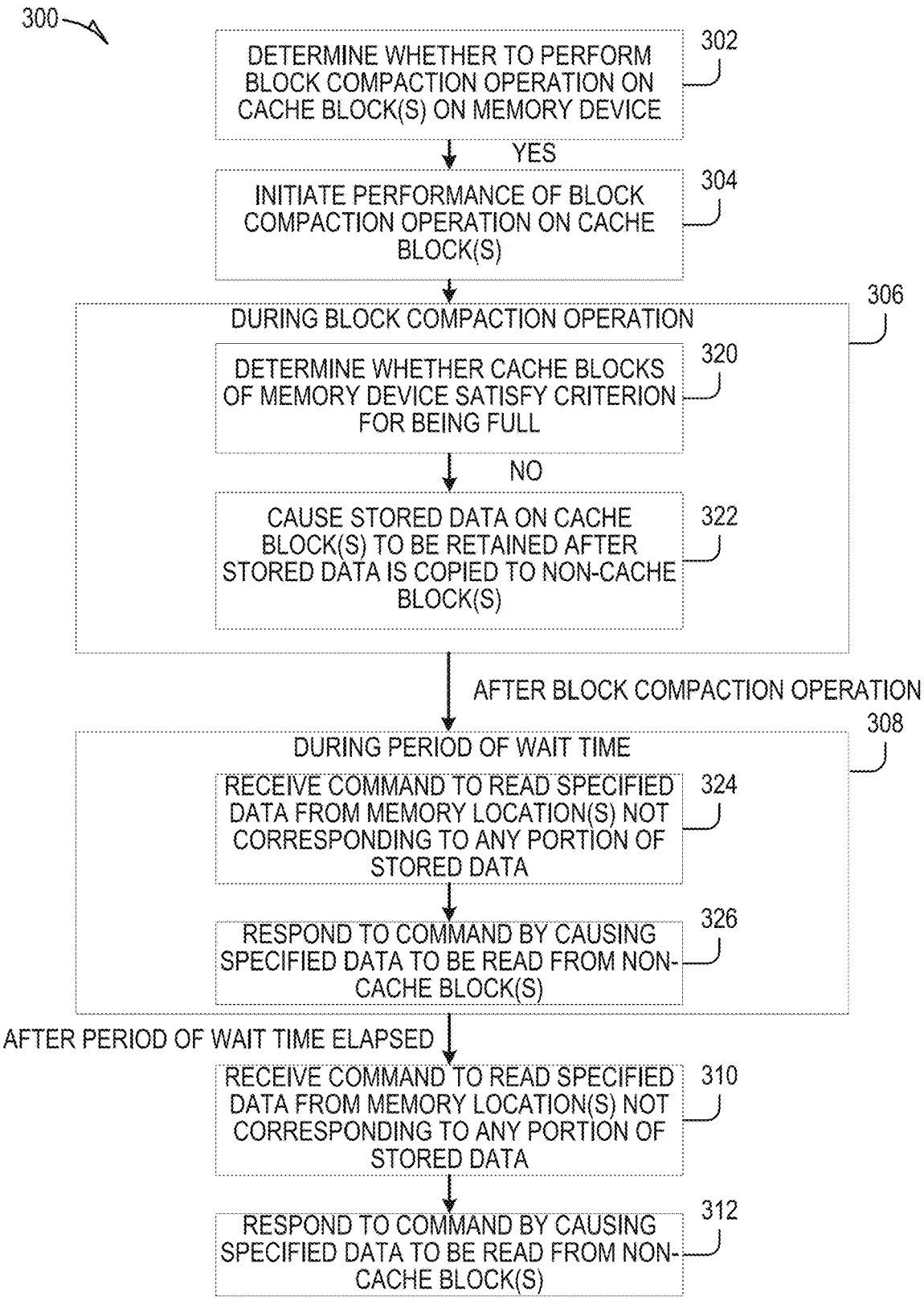

Referring now to the method 300 of FIG. 3, the method 300 illustrates an example of enabling and using extended read buffering using cache blocks in connection with a data transfer from cache blocks to non-cache blocks, in accordance with some embodiments. In comparison to the method 200 of FIG. 2, the method 300 illustrates how some embodiments handle a command to read requested data from one or more memory location(s) not corresponding to any portion of stored data on one or more cache blocks. For some embodiments, operations 302, 304, 306, 320, 322 are respectively similar to operations 202, 204, 206, 220, 222 of the method 200 described with respect to FIG. 2.

At operation 308, during the period of wait time after the block compaction operation ends, the processing device (e.g., 117) performs one or both of operations 324 and 326. For operation 324, the processing device (e.g., 117) receives, from a host (e.g., the host system 120), a command to read specified (or requested) data from one or more memory locations on the memory device (e.g., 130) not corresponding to any current data stored on the one or more cache blocks. At operation 326, the processing device (e.g., 117) responds to the command by causing the specified data to be read from the one or more non-cache blocks (e.g., xLC blocks).

Eventually, after the period of time has elapsed (e.g., completely elapsed or expired) after the block compaction operation has ended, at operation 310, the processing device (e.g., 117) receives, from the host (e.g., the host system 120), a command to read specified (or requested) data from one or more memory locations on the memory device (e.g., 130) not corresponding to any current data stored on the one or more cache blocks. Like operation 326, at operation 312, the processing device (e.g., 117) responds to the command (received by operation 310) by causing the specified data to be read from the one or more non-cache blocks (e.g., xLC blocks).

Figure 4:
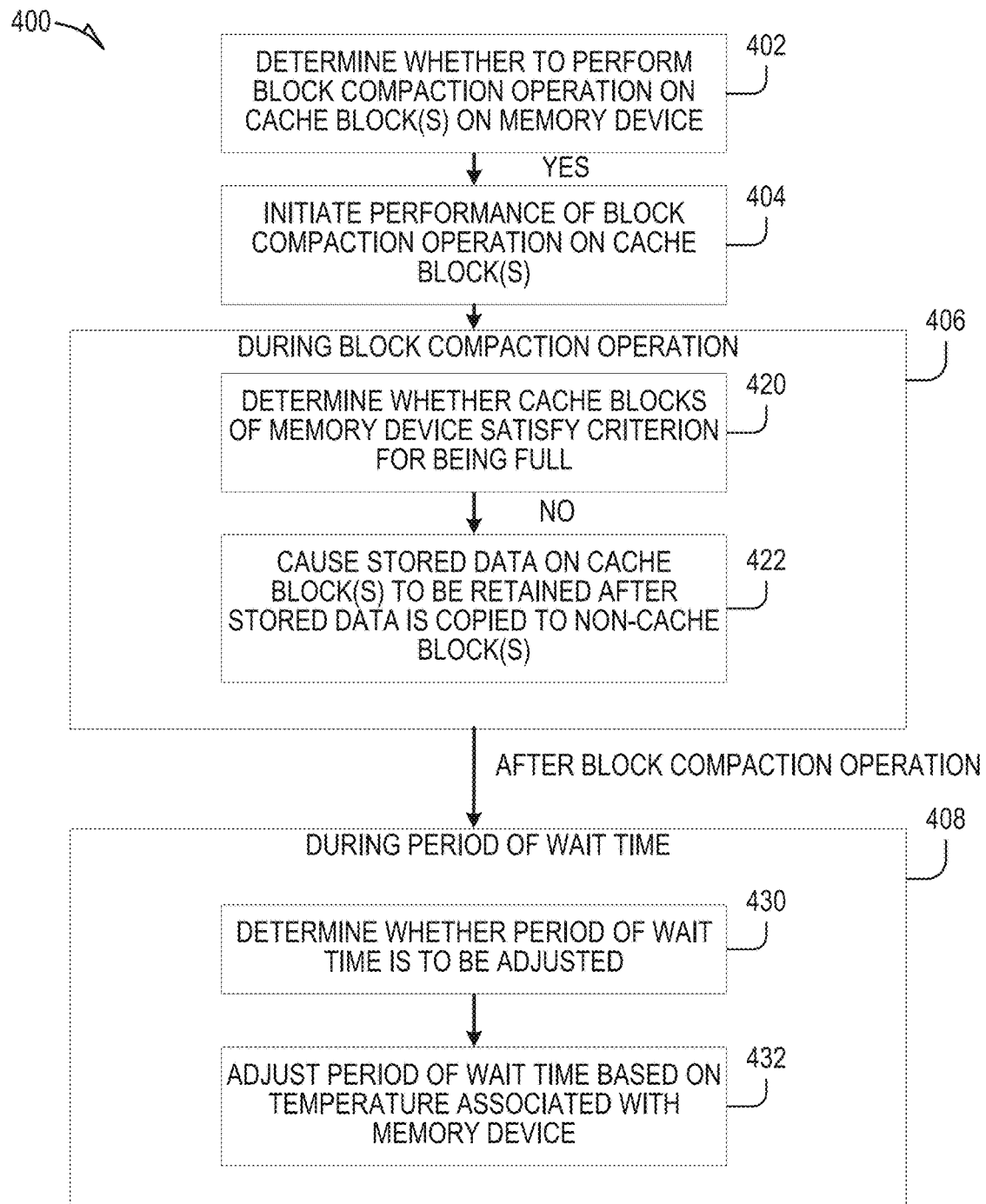

Referring now to the method 400 of FIG. 4, the method 400 illustrates an example of enabling and using extended read buffering using cache blocks in connection with a data transfer from cache blocks to non-cache blocks, in accordance with some embodiments. In comparison to the method 200 of FIG. 2, the method 400 illustrates how some embodiments, during a period of wait time, adjust the period of wait time based on a temperature. For some embodiments, operations 402, 404, 406, 420, 422 are respectively similar to operations 202, 204, 206, 220, 222 of the method 200 described with respect to FIG. 2.

At operation 408, during the period of wait time after the block compaction operation ends, the processing device (e.g., 117) performs one or both of operations 430 and 432. For operation 430, the processing device (e.g., 117) determines (e.g., determine periodically) whether the period of wait time is to be adjusted (e.g., updated). For instance, based on how much time has already elapsed since the compaction operation ended (e.g., how much of the period of wait time has already elapsed), a temperature associated with set of non-cache blocks (e.g., current temperature obtained for the memory device), or both, the processing device can determine whether the period of wait time is to be adjusted. Depending on the embodiment, operation 430 can be performed periodically, or when one or more conditions are satisfied, during the period of wait time. For instance, if the period of wait time as initially determined is less than a specified threshold (e.g., 3 minutes), operation 430 can be avoided.

In response to the processing device determining that the period of wait time is to be adjusted, at operation 432, the processing device (e.g., 117) adjusts the period of wait time based on the temperature (e.g., obtained by operation 430) or based on a newly obtained temperature associated with the set of non-cache blocks. For example, the wait time can be increased if a period of time (e.g., high temp period) is detected where temperature (associated with the set of non-cache blocks) is higher than the temperature used to initially determine the period of wait time. However, during the period of wait time, the period of wait time can be decreased if a period of time (e.g., low temp period) is detected where a temperature (associated with the set of non-cache blocks) is lower than the temperature used to initially determine the period of wait time. In this way, the period of wait time can be dynamically adjusted based on temperature changes during the period of wait time (e.g., as we wait for the period of wait time to expire) after the block compaction operation.

Figure 5:
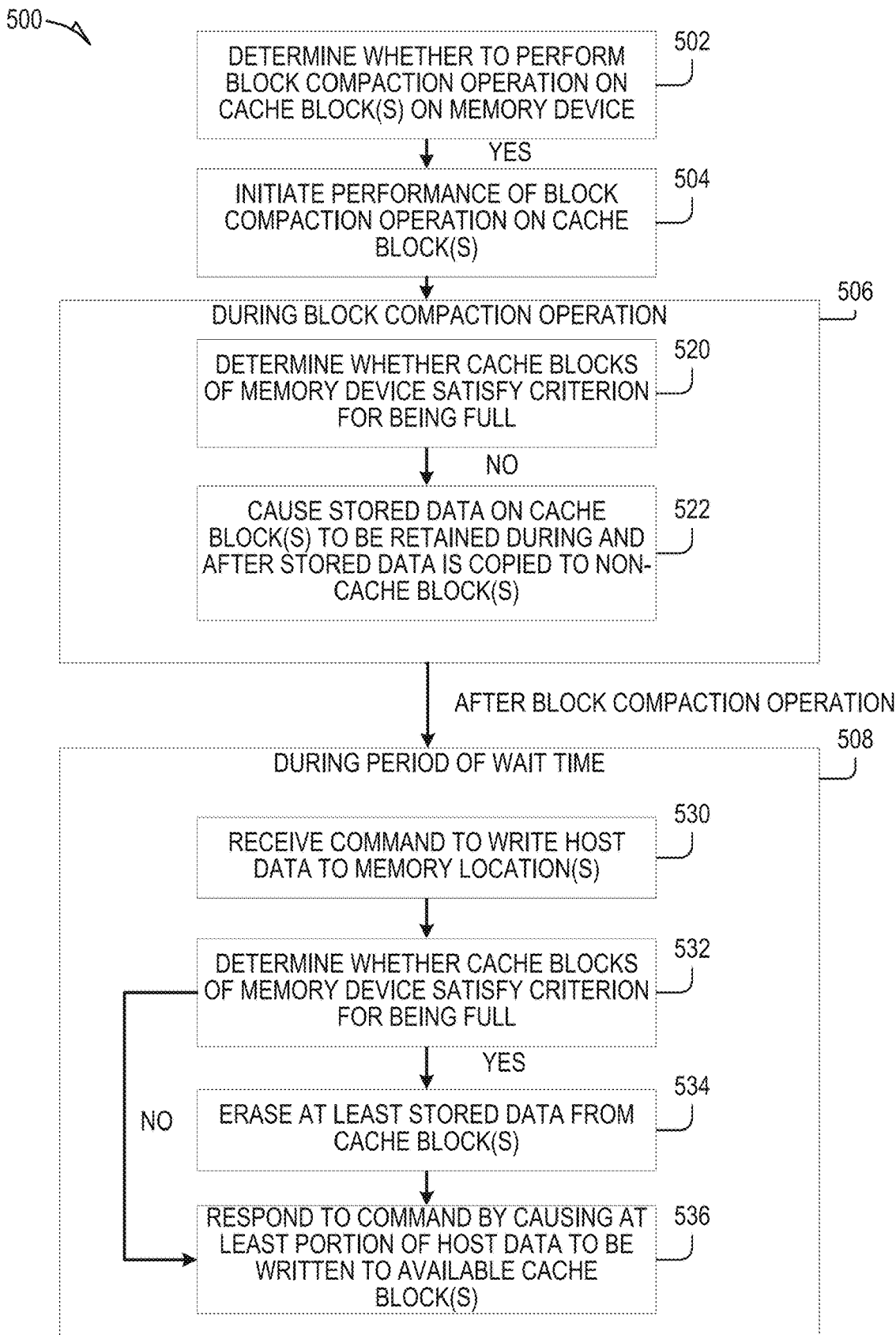

Referring now to the method 500 of FIG. 5, the method 500 illustrates an example of enabling and using extended read buffering using cache blocks in connection with a data transfer from cache blocks to non-cache blocks, in accordance with some embodiments. In comparison to the method 200 of FIG. 2, the method 500 illustrates how some embodiments, during a period of wait time, handle a command to write host data to one or more memory locations. For some embodiments, operations 502, 504, 506, 520, 522 are respectively similar to operations 202, 204, 206, 220, 222 of the method 200 described with respect to FIG. 2.

At operation 508, during the period of wait time after the block compaction operation ends, the processing device (e.g., 117) performs one or more of operations 530, 532, 534, and 536. For operation 530, the processing device (e.g., 117) receives, from a host (e.g., the host system 120), a command to write host data to one or more memory locations on the memory device (e.g., 130) and, in response, at operation 532, the processing device (e.g., 117) determines whether the set of cache blocks satisfies a criterion for being full as described herein. In response to the processing device determining that the set of cache blocks satisfies the criterion for being full, the method 500 continues to operation 534. In response to the processing device determining that the set of cache blocks does not satisfy the criterion for being full, the method 500 continues to operation 536. At operation 534, the processing device (e.g., 117) erases at least the stored data (that was retained by operation 522 during copy) from the one or more cache blocks and, thereafter, the method 500 proceeds to operation 536. For some embodiments, all cache blocks in the set of cache blocks are erased during operation 534.

During operation 536, the processing device (e.g., 117) responds to the command to write (received by operation 530) by causing at least a portion of the host data to be written to at least one cache block of the set of cache blocks. Where operation 534 is performed prior to operation 536, operation 536 may or may not involve writing at least a portion of the host data to at least one cache block of the one or more cache clock that was erased by operation 534.

Figure 6:
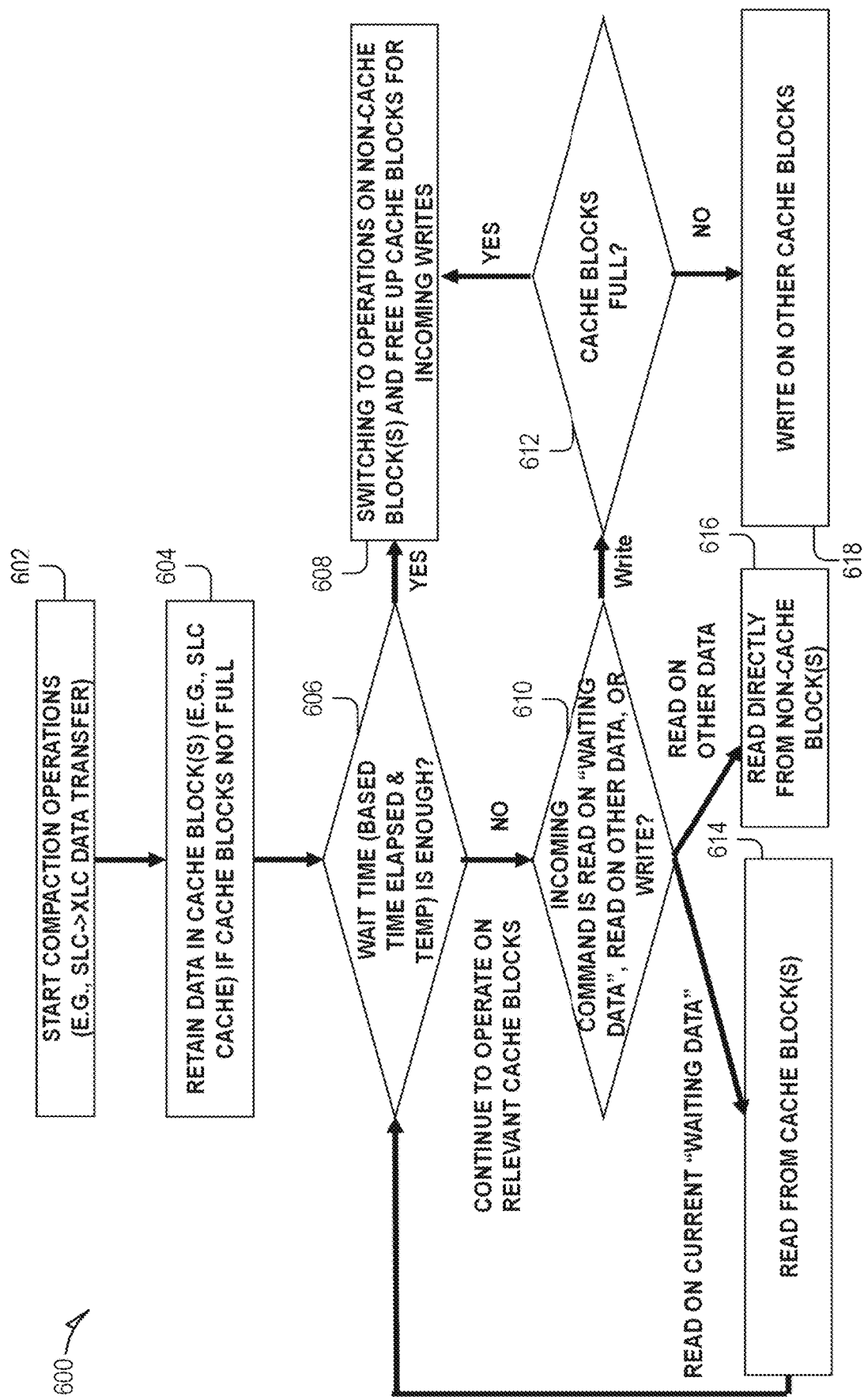

Referring now to the method 600 of FIG. 6, the method 600 illustrates an example of enabling and using extended read buffering using cache blocks in connection with a data transfer from cache blocks to non-cache blocks, in accordance with some embodiments. According to some embodiments, the method 600 illustrates an example of a method that combines one or more portions of the methods 200, 300, 400, 500.

At operation 602, a processing device (e.g., the processor 117 of the memory sub-system controller 115) initiates (e.g., starts) one or more block compaction operations, where data stored on one or more cache blocks (such as SLC blocks associated with SLC caching) are to be transferred to one or more non-cache blocks, such as xLC blocks. To facilitate the transfer, at operation 604, the processing device (e.g., 117) copies the data from the one or more cache blocks to the one or more non-cache blocks while retaining the data (as "waiting data") on the one or more cache blocks if the cache blocks are not full (e.g., cache blocks are currently available for new write data). At operation 606, if the processing device (e.g., 117) determines a wait time since the block compaction operation is enough to stop retaining the data (the waiting data) on the one or more cache blocks, the processing device switches to operations that use one or more non-cache blocks to service one or more read commands from a host (e.g., a host system 120) at operation 608. If it is determined that the wait time is not enough, then one or more cache blocks are used to service the one or more read commands and the method 600 continues to operation 610. The wait time can be based on a temperature associated with the one or more non-cache blocks (e.g., the temperature of the one or more non-cache blocks when data is copied to the one or more non-cache blocks).

When the processing device receives an incoming command from the host (e.g., 120), at operation 610, the processing device (e.g., 117) determines whether the incoming command is to read on at least a portion of the waiting data (retained on the one or more cache blocks), read on other data, or write data. In response to the processing device determining that incoming command is to read on at least a portion of the waiting data, the method 600 proceeds to operation 614. In response to the processing device determining that incoming command is to read on other data, the method 600 proceeds to operation 616. In response to the processing device determining that incoming command is to write data, the method 600 proceeds to operation 612.

At operation 614, the processing device (e.g., 117) causes the at least portion of the waiting data to be read from the one or more cache blocks. At operation 616, the processing device (e.g., 117) causes the other data to be read directly from one or more non-cache blocks. Alternatively, at operation 612, the processing device (e.g., 117) determines whether cache blocks are considered full (e.g., no cache blocks are available).

In response to the processing device determining (at operation 612) that cache blocks are considered full, the method 600 proceeds to operation 608, as described herein. In response to the processing device determining (at operation 612) that cache blocks are not considered full, the method 600 proceeds to operation 618, where the processing device (e.g., 117) causes data to be written on other cache blocks (cache blocks other than those storing and retaining the waiting data).

Figure 7:
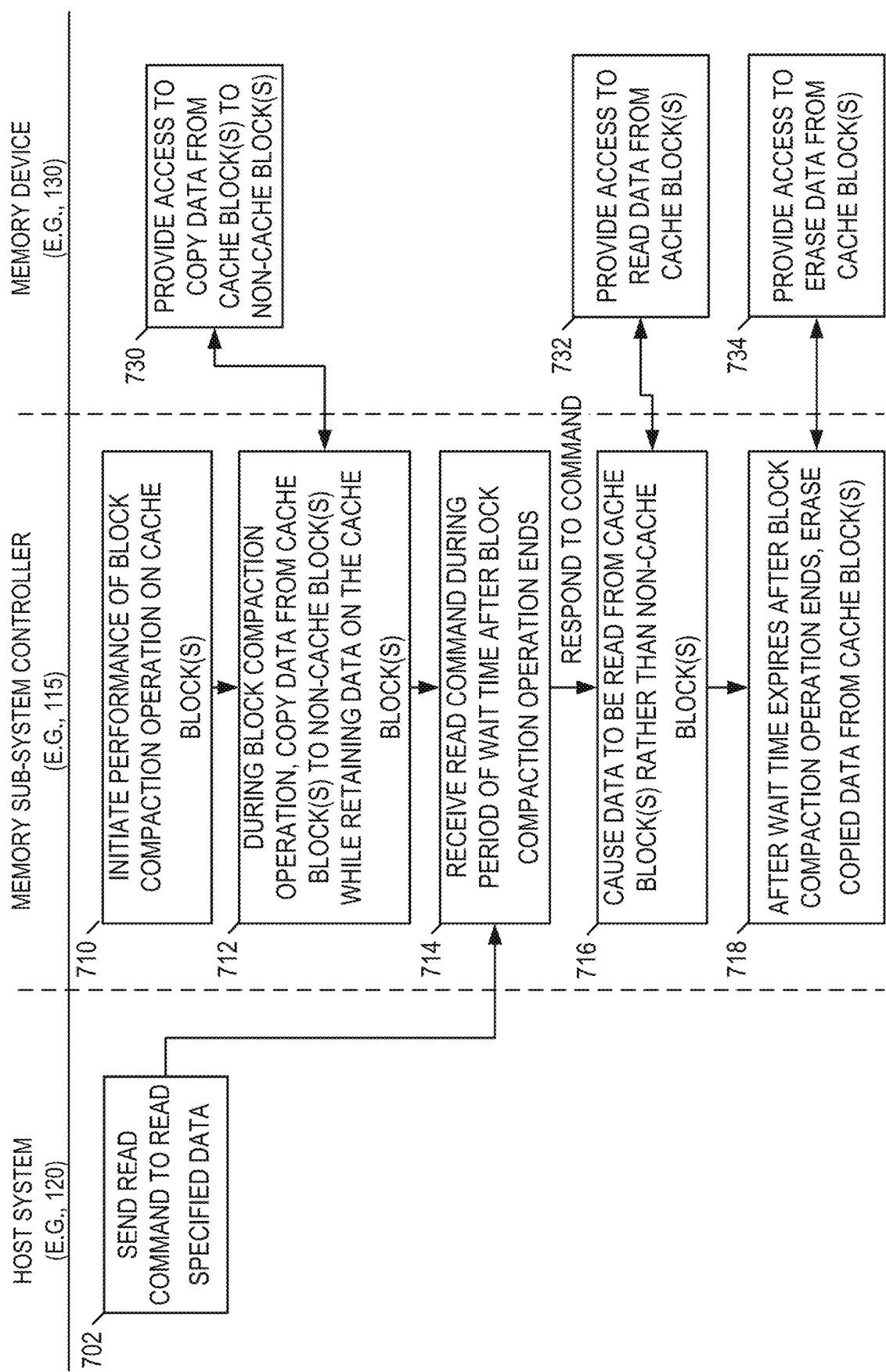
FIG. 7 provides an interaction diagram illustrating interactions between components of a computing environment in the context of some embodiments in which a method that extends read buffering using cache blocks as described herein is performed.

FIG. 7 provides an interaction diagram illustrating interactions between components of a computing environment in the context of some embodiments in which a method that extends read buffering using cache blocks as described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 130 or 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. In the context of the example illustrated in FIG. 7, the host system can include the host system 120, the memory sub-system controller can include the memory sub-system controller 115, and the memory device can include the memory device 130.

As shown in FIG. 7, at operation 710, the memory sub-system controller 115 initiates (e.g., starts) performance of a block compaction operation on one or more cache blocks. During the block compaction operation, at operation 712, the memory sub-system controller 115 copies data from the one or more cache blocks to one or more non-cache blocks while retaining the data on the one or more cache blocks (e.g., causing the one or more cache blocks to retain the data rather than be erased). To facilitate this, at operation 730, the memory device 130 provides access to the one or more cache blocks and the one or more non-cache blocks to copy data from the one or more cache blocks to the one or more non-cache blocks.

At operation 702, the host system 120 sends a read command to read specified data from the memory sub-system (e.g., 110) and, at operation 714, the memory sub-system controller 115 receives the read command from the host system 120 during a period of wait time after the block compaction operation ends. At operation 716, the memory sub-system controller 115 responds to the read command (at operation 714) by causing at least a portion of the specified data, corresponding to data retained on the one or more cache blocks, to be read from the one or more cache blocks rather than the one or more non-cache blocks. To facilitate this, at operation 732, the memory device 130 provides access to the one or more cache blocks to read the portion of the specified data from the one or more cache blocks.

After the period of wait time has expired after the block compaction operation ends, at operation 718, the memory sub-system controller 115 causes the copied data to be erased from the one or more cache blocks. To facilitate this, at operation 734, the memory device 130 provides access to the one or more cache blocks to erase retained data (e.g., waiting data) from the one or more cache blocks.

Figure 8:
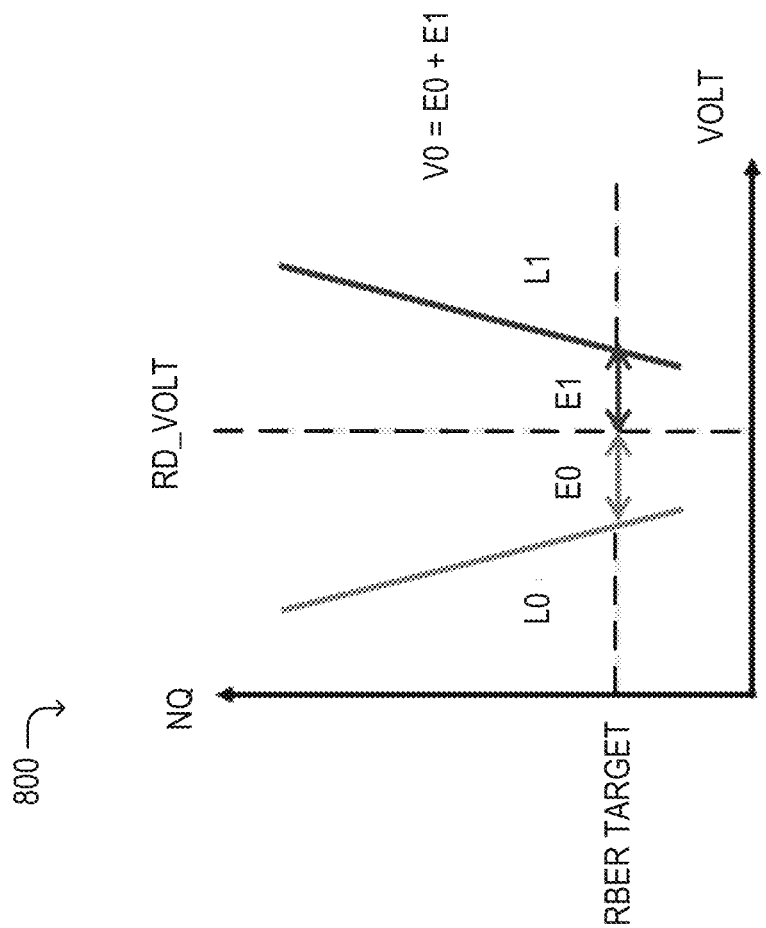
FIG. 8 is a diagram illustrating a graph illustrating example charge distributions and example energy margins for a memory cell, in accordance with some embodiments of the present disclosure.

FIG. 8 is a diagram illustrating a graph 800 illustrating example charge distributions for levels L0 and L1 and example energy zero and energy zero (E0) and energy one (E1) margins for a memory cell, in accordance with some embodiments of the present disclosure. As described herein, wait time provided by various embodiments can provide a set of non-cache blocks with extra bake time before a RD, which in turn can provide improved charge margins, such as larger E0 margins, for memory cells of the set of non-cache blocks.

Figure 9:
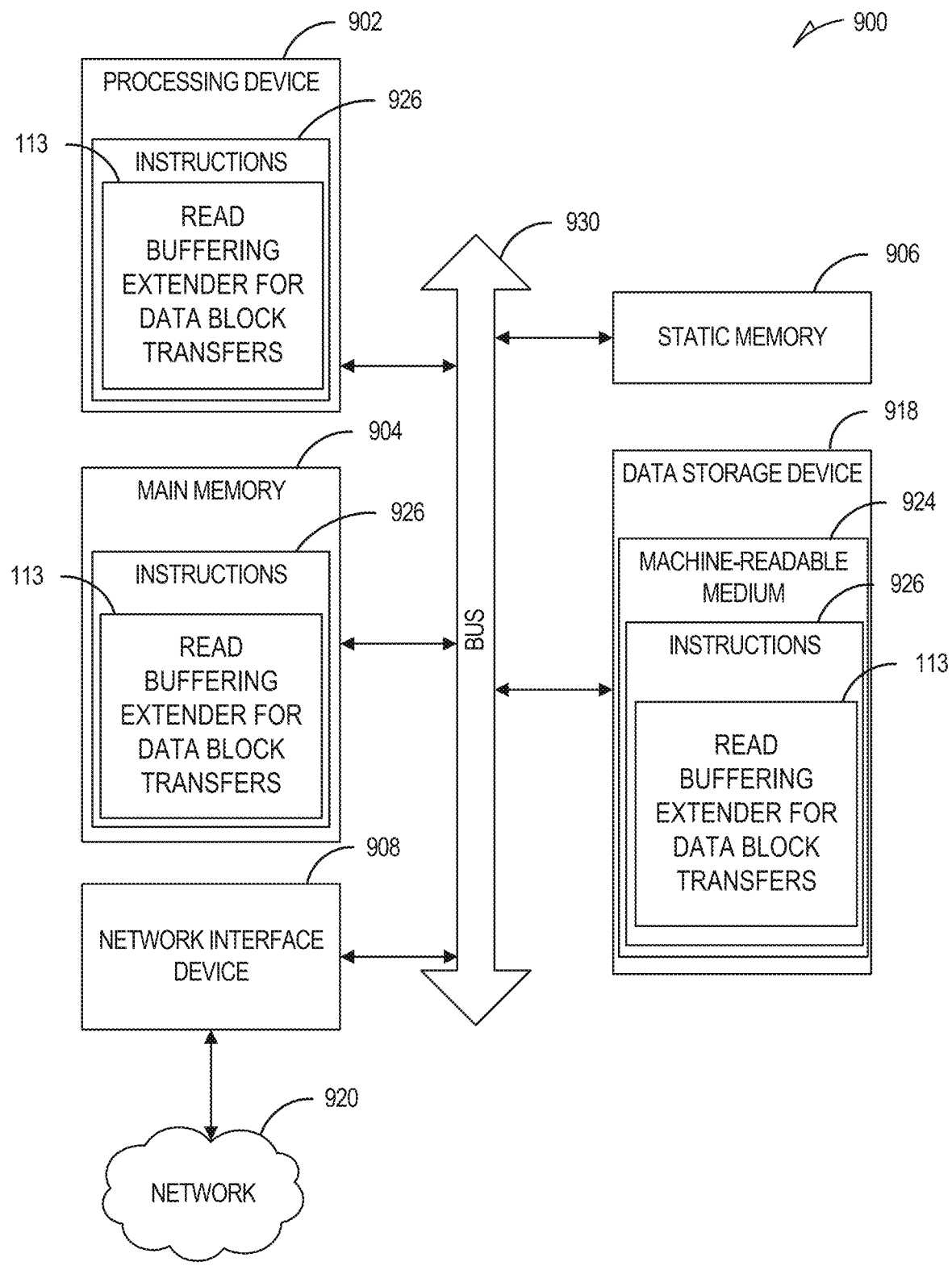
FIG. 9 is a block diagram of an example computer system in which embodiments of the present disclosure may operate.

FIG. 9 illustrates an example machine in the form of a computer system 900 within which a set of instructions can be executed for causing the machine to perform any one or more of the methodologies discussed herein. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., ROM, flash memory, DRAM such as SDRAM or Rambus DRAM (RDRAM), etc.), a static memory 906 (e.g., flash memory, static random access memory (SRAM), etc.), and a data storage device 918, which communicate with each other via a bus 930.

The processing device 902 represents one or more general-purpose processing devices such as a microprocessor, a central processing unit, or the like. More particularly, the processing device 902 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 902 can also be one or more special-purpose processing devices such as an application-specific integrated circuit (ASIC), a field programmable gate array (FPGA), a digital signal processor (DSP), a network processor, or the like. The processing device 902 is configured to execute instructions 926 for performing the operations and steps discussed herein. The computer system 900 can further include a network interface device 908 to communicate over a network 920.

The data storage device 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage device 918, and/or main memory 904 can correspond to the memory sub-system 110 of FIG. 1.

In one embodiment, the instructions 926 include instructions to implement functionality corresponding to extending read buffering in connection with data block transfers on a memory device as described herein (e.g., the read buffering extender 113 of FIG. 1). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising a plurality of blocks that comprise a set of cache blocks and a set of non-cache blocks; and
a processing device, operatively coupled to the memory device, configured to perform operations comprising:
determining whether to perform a block compaction operation on one or more of the set of cache blocks, the block compaction operation comprising copying stored data from the one or more cache blocks to one or more of the set of non-cache blocks;
in response to determining to perform the block compaction operation, initiating performance of the block compaction operation on the one or more cache blocks; and
while the block compaction operation is being performed on the one or more cache blocks:
determining whether the set of cache blocks satisfies a criterion for being full; and
in response to determining that the set of cache blocks does not satisfy the criterion for being full, causing the stored data to be retained on the one or more cache blocks after the stored data is copied to the one or more non-cache blocks, the stored data being retained for at least a period of wait time after the block compaction operation has ended.

2. The system of claim 1, wherein the operations comprise:
during the period of wait time after the block compaction operation has ended:
receiving, from a host, a command to read specified data from one or more memory locations on the memory device, at least one of the one or more memory locations corresponding to at least a portion of the stored data; and
in response to the stored data being retained on the one or more cache blocks, responding to the command by causing the portion of the stored data to be read from the one or more cache blocks rather than the one or more non-cache blocks.

3. The system of claim 1, wherein the operations comprise:
after the period of wait time has elapsed after the block compaction operation has ended, causing at least the stored data to be erased from the one or more cache blocks.

4. The system of claim 1, wherein the operations comprise:
receiving, from a host, a command to read requested data from one or more memory locations on the memory device not corresponding to current data stored on the one or more cache blocks; and
responding to the command by causing the requested data to be read from the one or more non-cache blocks.

5. The system of claim 1, wherein the operations comprise:
after the period of wait time has elapsed after the block compaction operation has ended:
receiving, from a host, a command to read requested data from one or more memory locations on the memory device, at least one of the one or more memory locations corresponding to at least a portion of the stored data; and
responding to the command by causing the requested data to be read from the one or more non-cache blocks.

6. The system of claim 1, wherein the operations comprise:
during the period of wait time after the block compaction operation has ended:
receiving, from a host, a command to write host data;
determining whether the set of cache blocks satisfies the criterion for being full; and
in response to determining that the set of cache blocks satisfies the criterion for being full, responding to the command by causing at least a portion of the host data to be written to the one or more cache blocks.

7. The system of claim 1, wherein the operations comprise:
during the period of wait time after the block compaction operation has ended:
receiving, from a host, a command to write host data;
determining whether the set of cache blocks satisfies the criterion for being full; and
in response to determining that the set of cache blocks satisfies the criterion for being full:
causing at least the stored data to be erased from the one or more cache blocks; and
responding to the command by causing at least a portion of the host data to be written to at least one cache block of the set of cache blocks.

8. The system of claim 1, wherein the set of cache blocks comprises one or more single-level cell (SLC) blocks, and the set of non-cache blocks comprises one or more multi-level cell (MLC) blocks, triple-level cell (TLC) blocks, or quad-level cell (QLC) blocks.

9. The system of claim 1, wherein the period of wait time is determined based on a temperature associated with the memory device.

10. The system of claim 1, wherein the operations comprise:
during the period of wait time after the block compaction operation has ended:
determining, based on how much time has already elapsed since the compaction operation ended and a temperature associated with the set of non-cache blocks, whether the period of wait time is to be adjusted; and
in response to determining that the period of wait time is to be adjusted, adjusting the period of wait time based on the temperature.

11. At least one non-transitory machine-readable storage medium comprising instructions that, when executed by a processing device, cause the processing device to perform operations comprising:

initiating performance of a block compaction operation on one or more of a set of cache blocks of a memory device, the block compaction operation comprising copying stored data from the one or more cache blocks to one or more non-cache blocks of the memory device; and while the block compaction operation is being performed on the one or more cache blocks:

determining whether the set of cache blocks satisfies a criterion for being full; and in response to determining that the set of cache blocks does not satisfy the criterion for being full, causing the stored data to be retained on the one or more cache blocks after the stored data is copied to the one or more non-cache blocks, the stored data being retained for at least a period of wait time after the block compaction operation has ended.

12. The at least one non-transitory machine-readable storage medium of claim 11, wherein the operations comprise:

during the period of wait time after the block compaction operation has ended:

receiving, from a host, a command to read specified data from one or more memory locations on the memory device, at least one of the one or more memory locations corresponding to at least a portion of the stored data; and in response to the stored data being retained on the one or more cache blocks, responding to the command by causing the portion of the stored data to be read from the one or more cache block rather than the one or more non-cache blocks.

13. The at least one non-transitory machine-readable storage medium of claim 11, wherein the operations comprise:

after the period of wait time has elapsed after the block compaction operation has ended, causing at least the stored data to be erased from the one or more cache blocks.

14. The at least one non-transitory machine-readable storage medium of claim 11, wherein the operations comprise:

receiving, from a host, a command to read requested data from one or more memory locations on the memory device not corresponding to current data stored on the one or more cache blocks; and responding to the command by causing the requested data to be read from the one or more non-cache blocks.

15. The at least one non-transitory machine-readable storage medium of claim 11, wherein the operations comprise:

after the period of wait time has elapsed after the block compaction operation has ended:

receiving, from a host, a command to read requested data from one or more memory locations on the memory device, at least one of the one or more memory locations corresponding to at least a portion of the stored data; and responding to the command by causing the requested data to be read from the one or more non-cache blocks.

16. The at least one non-transitory machine-readable storage medium of claim 11, wherein the operations comprise:

during the period of wait time after the block compaction operation has ended:

receiving, from a host, a command to write host data;

determining whether the set of cache blocks satisfies the criterion for being full; and in response to determining that the set of cache blocks satisfies the criterion for being full, responding to the command by causing at least a portion of the host data to be written to the one or more cache blocks.

17. The at least one non-transitory machine-readable storage medium of claim 11, wherein the operations comprise:

during the period of wait time after the block compaction operation has ended:

receiving, from a host, a command to write host data;

determining whether the set of cache blocks satisfies the criterion for being full; and in response to determining that the set of cache blocks satisfies the criterion for being full:

causing at least the stored data to be erased from the one or more cache blocks; and responding to the command by causing at least a portion of the host data to be written to at least one cache block of the set of cache blocks.

18. The at least one non-transitory machine-readable storage medium of claim 11, wherein the set of cache blocks comprises one or more single-level cell (SLC) blocks, and the set of non-cache blocks comprises one or more multi-level cell (MLC) blocks, triple-level cell (TLC) blocks, or quad-level cell (QLC) blocks.

19. The at least one non-transitory machine-readable storage medium of claim 11, wherein the period of wait time is determined based on a temperature associated with the memory device.

20. A method comprising:

initiating performance of a block compaction operation on one or more of a set of cache blocks of a memory device, the block compaction operation comprising copying stored data from the one or more cache blocks to one or more non-cache blocks of the memory device; and while the block compaction operation is being performed on the one or more cache blocks:

determining whether the set of cache blocks satisfies a criterion for being full; and in response to determining that the set of cache blocks does not satisfy the criterion for being full, causing the stored data to be retained on the one or more cache blocks after the stored data is copied to the one or more non-cache blocks, the stored data being retained for at least a period of wait time after the block compaction operation has ended.

* * * * *